Figure 1:
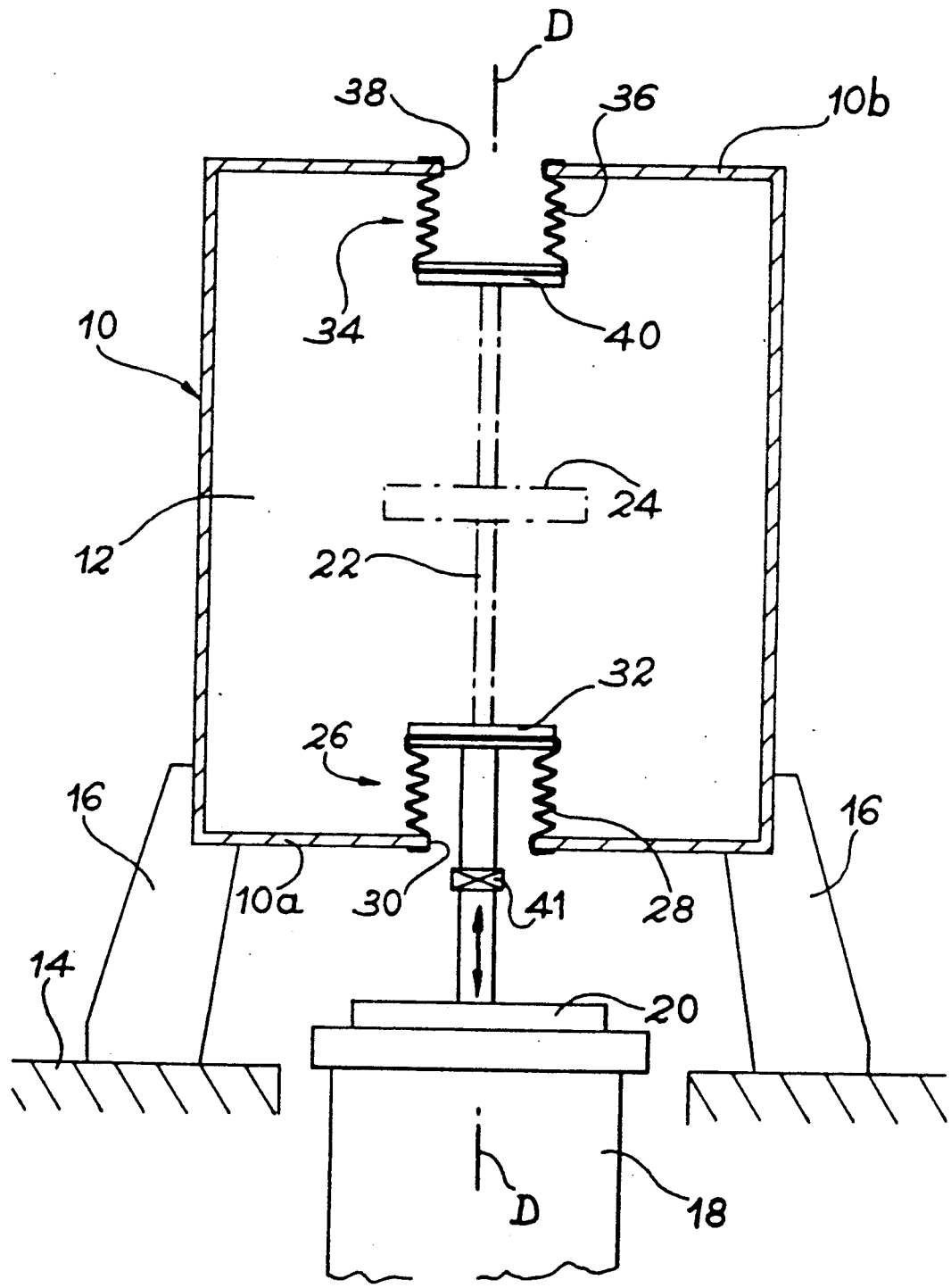

United States Patent [19]

Rollet et al.

[11] Patent Number: 5,038,617
[45] Date of Patent: Aug. 13, 1991

[54] APPARATUS FOR THE UNDIRECTIONAL VIBRATION TESTING OF AN EQUIPMENT UNDER A CONTROLLED ATMOSPHERE

[75] Inventors: Robert Rollet, La Roquette sur Siagne; Jean-Claude Achor, Mandelieu, both of France

[73] Assignee: Aerospatiale Societe Nationale Industrielle, Paris, France

[21] Appl. No.: 586,810
[22] Filed: Sep. 24, 1990

[30] Foreign Application Priority Data

Sep. 26, 1989 [FR] France ................. 89 12583

[51] Int. Cl.⁵ .............................. G01N 17/00
[52] U.S. Cl. .............................. 73/662; 73/865.6
[58] Field of Search ........... 73/662, 663, 668, 666, 73/865.6

[56] References Cited

U.S. PATENT DOCUMENTS 3,241,358  3/1966  Booth et al. ................. 73/668
4,748,851  6/1988  Yoneda ....................... 73/668

FOREIGN PATENT DOCUMENTS 2031160  10/1978  United Kingdom .

Primary Examiner—Hezron E. Williams
Assistant Examiner—William Francos
Attorney, Agent, or Firm—Hayes, Soloway, Hennessey & Hage

[57] ABSTRACT

Unidirectional vibration testing apparatus under a controlled atmosphere comprising a tight enclosure (10) in which is placed a support (24) for the equipment to be tested and a vibration generator (18) positioned outside the enclosure and connected to the support by a connecting rod (22). The latter is connected to two opposite walls (10a, 10b) of the enclosure by two identical sealing systems (26, 34) mounted in opposition, so as to eliminate the parasitic or spurious effects induced by the sealing system (26), which must be placed between the rod (22) and the wall (10a) located between the vibration generator (18) and the support (24).

7 Claims, 2 Drawing Sheets

APPARATUS FOR THE UNDIRECTIONAL VIBRATION TESTING OF AN EQUIPMENT UNDER A CONTROLLED ATMOSPHERE

DESCRIPTION

The invention relates to an apparatus making it possible to carry out unidirectional vibration testing of an equipment under a controlled atmosphere.

Such as an apparatus is used for the vibration testing of equipment of very varied nature designed to be carried on board spacecraft, such as satellites. Thus and in an exemplified manner only, such equipment can be mechanisms having moving parts, static structures such as tanks, or electronic components.

The vibration testing of equipment to be carried on board a space vehicle constitutes an essential stage in the inspection and checking of such equipment. Thus, it is important to ensure that the various equipment carried on the vehicle can withstand the very high vibrations produced during launch and without suffering irreparable damage.

In order that the vibration tests are representative of real conditions, the equipment must necessarily be placed under a controlled atmosphere, whose characteristics are representative of the medium in which the equipment is located on launch. For this reason, it is necessary to place the equipment which it is wished to vibration test within a tight enclosure in which is located a controlled medium having characteristics different from those of the external medium, particularly with respect to the pressure.

In order that the vibration generator, normally constituted by a vibrating container, can operate in a satisfactory manner, it is normally placed outside the tight enclosure and is connected to an equipment support with the enclosure by a rigid connecting rod, which tightly traverses a wall of the enclosure located between the support and the vibrating container. At the location of this passage, it is standard practice to use a sealing bellows, whose opposite faces are subject to the different pressures prevailing respectively inside and outside the enclosure. Under the effect of this pressure difference, spurious forces or stresses are added to the vibrations transmitted to the equipment during testing, which has the effect of falsifying the test and leading to imprecise measurements. Moreover, other parasitic effects are induced by the fact that the reciprocating movement of the connecting rod produced by the vibrations alternately lead to an increase and a decrease in the internal volume of the enclosure.

The invention specifically relates to a controlled atmosphere, unidirectional vibration testing apparatus, whose original design makes it possible to eliminate any spurious stress and any volume variation within the enclosure, in order to significantly improve the accuracy of the measurements performed.

According to the invention, this result is obtained by means of a controlled atmosphere, unidirectional vibration testing apparatus, comprising a support placed within a tight enclosure in which there is a controlled atmosphere, a vibration generator placed outside the enclosure, a rigid connecting rod connecting the vibration generator to said support through a first fixed wall of the enclosure, characterized in that a first and a second mobile wall portions are rigidly connected to the connecting rod respectively in the vicinity of the first fixed wall and a second fixed wall of the enclosure opposite to the first fixed wall, a first and a second sealing bellows respectively connecting the first mobile wall portion to the first fixed wall and the second mobile wall portion to the second fixed wall.

In a preferred embodiment of the invention, in view of the fact that the vibrations supplied by the vibration generator are unidirectional, it is of interest to perfectly guide the vibrations applied to the equipment during testing by equipping the first and second walls of the enclosure with translation guidance means in which the connecting rod is received.

In order to take account of the alignment problems between the outlet member of the vibration generator and that part of the connecting rod which is received in the guidance means, the connecting rod advantageously comprises, between the guidance means fixed to the first wall and the vibration generator, means forming a double articulation and preferably having two assemblies, each having two groups of two opposite flats arranged at 90° from one another on the connecting rod.

The invention is described in greater detail hereinafter relative to two non-limitative embodiments and the attached drawings, wherein show:

FIG. 1 A sectional view very diagrammatically showing a vibration testing apparatus according to the invention.

Figure 2:
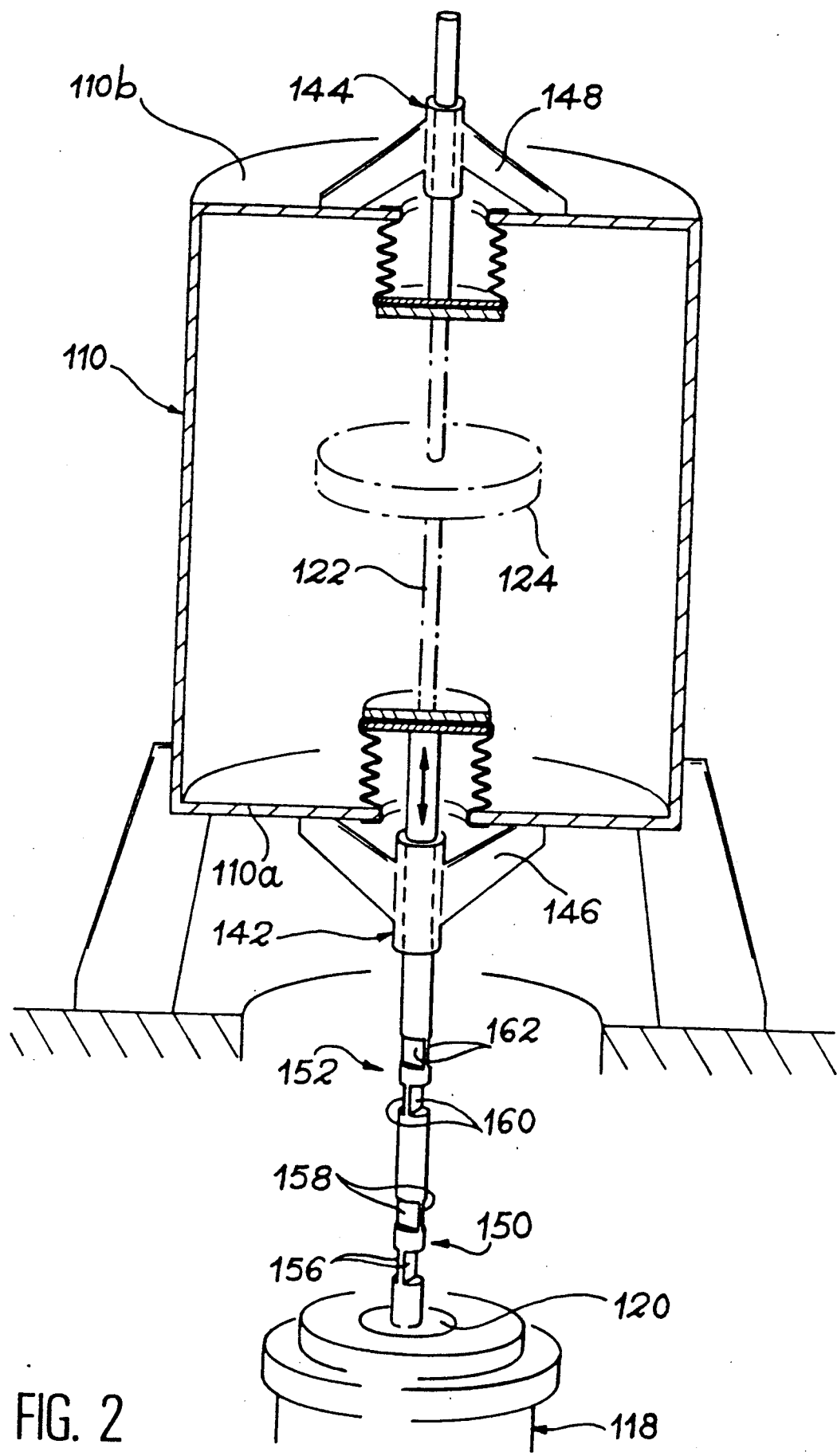

FIG. 2 A view comparable to FIG. 1 showing a second embodiment of the testing apparatus according to the invention, in which the directions of the vibration is perfectly controlled.

FIG. 1 diagrammatically shows a controlled atmosphere, unidirectional vibration testing apparatus according to a first embodiment of the invention. This testing apparatus comprises a tight enclosure 10 internally defining a closed volume 12 in which is located a medium having characteristics different from those of the external medium. In particular, the medium contained in the volume 12 can be air at a pressure below atmospheric pressure. The conditions prevailing within the volume 12 are permanently controlled by appropriate circuits associated with the enclosure 10 and which are not shown in FIG. 1. These circuits can in particular be vacuum circuits or ventilation and filtration circuits which are well known to the Experts.

The tight enclosure 10 is rigidly connected to a fixed support structure 14 by any appropriate structure such as feet 16.

The support structure 14 also supports a unidirectional vibration generator 18, e.g. constituted by a vibrating container, whereof an outlet member 20 performs a high frequency reciprocating movement in a given direction indicated by line D—D in FIG. 1.

In view of the fact that the vibration generator 18 is located outside the enclosure 10, whereas the equipment which is to be vibration tested must be placed inside said enclosure, a rigid connecting rod 22 is provided for connecting the outlet member 20 of the vibration generator to an equipment support 24 located within the tight enclosure 10. The connecting rod 22 is a rectilinear cylindrical rod, whose axis D—D is oriented in the direction of the reciprocating movement to which the outlet member 20 of the vibration generator is exposed when the latter is operated. In the represented embodiment, said axis D—D is vertical and vibration generator 18 is positioned below the enclosure 10, which is a cylindrical enclosure centred on said axis.

The equipment support 24 has a structure adapted to the nature and shape of the equipment which it is wished to control, so that its configuration will differ as a function of said equipment. For example, it can be a frame equipped with fixing means, such as threaded rods or screws.

In view of the fact that the support 24 is placed within the enclosure 10, whereas the vibration generator 18 is located outside the latter, the connecting rod 22 necessarily traverses one 10a of the enclosure walls. Preferably, said wall 10a is a planar wall oriented in a direction perpendicular to the axis D—D. Therefore the connecting rod 22 is perpendicular to said wall 10a, which forms the horizontal base of the enclosure 10 in the represented embodiment.

In order to guarantee the seal of the passage of wall 10a by the connecting rod 22 despite the alternating reciprocating movement transmitted to the latter by the vibration generator 18, a first sealing device designated in general terms by the reference 26 is provided between the said wall 10a and the rod 22.

This sealing device 26 comprises a sealing bellows 28, whereof one end is tightly fixed to the edge of a circular opening 30 formed in the wall 10a and centred on the axis of the rod 22. The opposite end of the bellows 28 is tightly fixed to the peripheral edge of the disk-shaped, mobile wall portion 32 fixed to the connecting rod 22 and centred on the axis of said rod. The mobile wall portion 32 is parallel to the wall 10a of the tight enclosure 10 and is inwardly displaced with respect thereto relative to the wall 10a. The internal diameters of the opening 30 and the mobile wall portion 32 are such that the neutral fibre of the sealing bellows 28 has a generally cylindrical configuration centred on the axis of the rod 22.

If the test apparatus was produced in such a way that the equipment support 24 was located at the end of the connecting rod 22 within the tight enclosure 10, the aforementioned structure of the sealing device could induce errors in the vibration tests carried out. Thus, the mobile wall portion 32 is permanently exposed to the pressure difference between the external medium and the medium contained in the volume 12. A spurious force superimposed on that exerted by the vibration generator 18 would then be permanently applied to the rod 22. Moreover, each reciprocating movement of the connecting rod 22 would lead to successive increases and decreases in the internal volume 12 of the enclosure adding another error source to the measurements.

According to the invention, all these error sources are eliminated by extending the connecting rod 22 up to a wall 10b of the enclosure 10 opposite to the wall 10a and by connecting the rod 22 to said wall 10b by a sealing device 34 completely identical to the device 26 and positioned symmetrically or in opposition with respect to the latter.

Thus, as the wall 10b is preferably planar and parallel to the wall 10a, the sealing device 34 has a second sealing bellows 36 centred on the axis of the rod 22, whereof one end is tightly fixed to a circular opening 38 formed in the wall 10b and centred on the axis of the rod 22. The opposite end of the bellows 36 is tightly fixed to the peripheral edge of a mobile wall portion 40 shaped like a disk and which is fixed to the end of the connecting rod 22 and centred on the axis of the latter. The mobile wall portion 40 is parallel to the enclosure wall 10b and displaced inwards of the latter relative to the wall 10b over a distance, approximately equal to that separating the mobile wall portion 32 from the enclosure wall 10a. The dimensions of the openings 30 and 38, the mobile wall portions 32, 40 and the sealing bellows 28, 36 are identical.

As a result of the aforementioned arrangement, the parasitic stresses and forces applied to the mobile wall portion 32 as a result of the pressure difference between the interior and exterior of the enclosure 10 are perfectly balanced by the stresses and forces of the same origin applied in the reverse direction to the mobile wall portion 40. Therefore these parasitic forces are cancelled out and do not disturb the forces alternately applied in the reverse direction to the connecting rod 22 by the vibration generator 18.

Moreover, the alternate increases and decreases of the internal volume 12 of the enclosure 10 resulting from the displacement of the mobile wall portion 32 with the connecting rod 22 are also cancelled out by the displacements of the mobile wall portion 40 also fixed to the rod 22.

Advantageously, that part of the connecting rod 22 which is located outside the enclosure 10 has a disconnectable coupling 41, whose disconnection makes it possible to readily transport the enclosure 10 to a random site.

The above description shows that the test apparatus according to the invention makes it possible to carry out controlled atmosphere, unidirectional vibration testing without the results of the measurements being disturbed by the structure of the apparatus.

FIG. 2 shows a second embodiment of the testing apparatus according to the invention. In this embodiment, all the apparatus characteristics described with reference to FIG. 1 are retained. However, these characteristics will not be described again. In order to facilitate understanding, the components identical to those of the first embodiment are designated by the same reference numerals increased by 100.

The embodiment of FIG. 2 constitutes an improvement to the embodiment of FIG. 1. This improvement is mainly directed at ensuring the perfectly unidirectional characterer of the vibrations applied to the equipment support 124. For this purpose, any lateral movement of the connecting rod 122 and the support 124 within the enclosure 110 is prevented by translation guidance means 142, 144 respectively fixed to the walls 110a, 110b of the enclosure 110 and in which the connecting rod 122 can slide parallel to its axis.

The guidance means 142, 144 are placed outside the tight enclosure 110 and are respectively connected to the walls 110a, 110b by fixing clips or tabs 146, 148. These guidance means can be constituted by simple bearings in which the connecting rod 122 can slide and freely rotate. They can also be constituted by slides preventing any rotation of the rod 122, such as ball slides.

In the arrangement of FIG. 2 in which that part of the connecting rod 122 traversing the tight enclosure 110 is perfectly guided in translation relative to the latter, it is very difficult to ensure a satisfactory alignment of the axis of the outlet member 120 of the vibration generator 118 with respect to said guided portion of the rod 122.

For this reason, it is advantageous to equip that part of the connecting rod 122 located between the vibration generator 118 and the guidance means 142 connected to the wall 110a with a double articulation. In the preferred embodiment illustrated in FIG. 2, said double articulation comprises two identical assemblies 150, 152, which are displaced along the axis of the rod 122 and enabling the axes of the connecting rod portions connected by said assemblies to be slightly inclined in a random direction, whilst still guaranteeing the perfect transmission of the reciprocating movement applied to the rod by the vibration generator.

Each of the assemblies 150, 152 comprises two groups of two opposite flats machined directly onto the rod 122, parallel to its axis and in two directions at 90° from one another. Thus, the assembly 150 comprises a first group of two parallel, opposite flats 156 and a second group of two opposite, parallel flats 158 oriented at 90° relative to the flats 156. In the same way, the assembly 152 comprises a first group of two parallel, opposite flats 160 and a second group of two parallel, opposite flats 162 oriented at 90° relative to the flats 160.

Preferably, but optionally, the flats 156, 160 on the one hand and the flats 158, 162 on the other are oriented in the same directions. Each group of two opposite flats formed in this way on the rod 122 reduces the latter to a blade having a certain flexibility in a plane passing through the axis of the rod and perpendicular to the flats. Each assembly, such as 150 and 152, thus defines on the rod 122 two zones in which the rod has a relative flexibility in two perpendicular planes and passing through the axis of the rod. The association of the two assemblies 150 and 152 consequently makes it possible to ensure a satisfactory transmission of the movement of the outlet member 120 of the vibration generator 118 to the part of the guide rod 122 received in the guide means 142, 144, despite any possible misalignment of the axes of these two parts. Experience has shown that such an arrangement makes it possible to integrally transmit the vibrations supplied by the generator 118 without modifying their characteristics.

Obviously the invention is not limited to the embodiment described in exemplified manner hereinbefore and covers all variants thereof. Thus, the shape of the tight enclosure 10 can differ from that described and the walls 10a and 10b need not be planar.

We claim:

1. Controlled atmosphere, unidirectional vibration testing apparatus, comprising a support placed within a tight enclosure in which there is a controlled atmosphere, a vibration generator placed outside the enclosure, a rigid connecting rod connecting the vibration generator to said support through a first fixed wall of the enclosure, characterized in that a first and a second mobile wall portions are rigidly connected to the connecting rod respectively in the vicinity of the first fixed wall and a second fixed wall of the enclosure opposite to the first fixed wall, a first and a second sealing bellows respectively connecting the first mobile wall portion to the first fixed wall and the second mobile wall portion to the second fixed wall.

2. Apparatus according to claim 1, wherein the connecting rod is a rectilinear rod oriented in a direction substantially perpendicular to the first and second fixed walls of the enclosure, the first and second mobile wall portions being substantially parallel to the first and second walls and displaced towards the inside of the enclosure with respect to the latter and the first and second sealing bellows are centred on the connecting rod.

3. Apparatus according to claim 1, wherein the first and second mobile wall portions have the same dimensions, as do the first and second sealing bellows.

4. Apparatus according to claim 1, wherein the connecting rod is received in translation guidance means respectively fixed to the first and second walls of the enclosure.

5. Apparatus according to claim 4, wherein the connecting rod comprises, between the guidance means fixed to the first wall and the vibration generator, means forming a double articulation.

6. Apparatus according to claim 5, wherein the means forming a double articulation comprise two assemblies each having two groups of opposite flats arranged at 90° of one another on the connecting rod.

7. Apparatus according to claim 1, wherein the connecting rod has dismantlable connecting means between a rod portion connected to the vibration generator and a rod portion connected to the enclosure.

* * * * *